INVENTORS
JOHN L. COLE
JULIUS J. MURAY

ATTORNEY

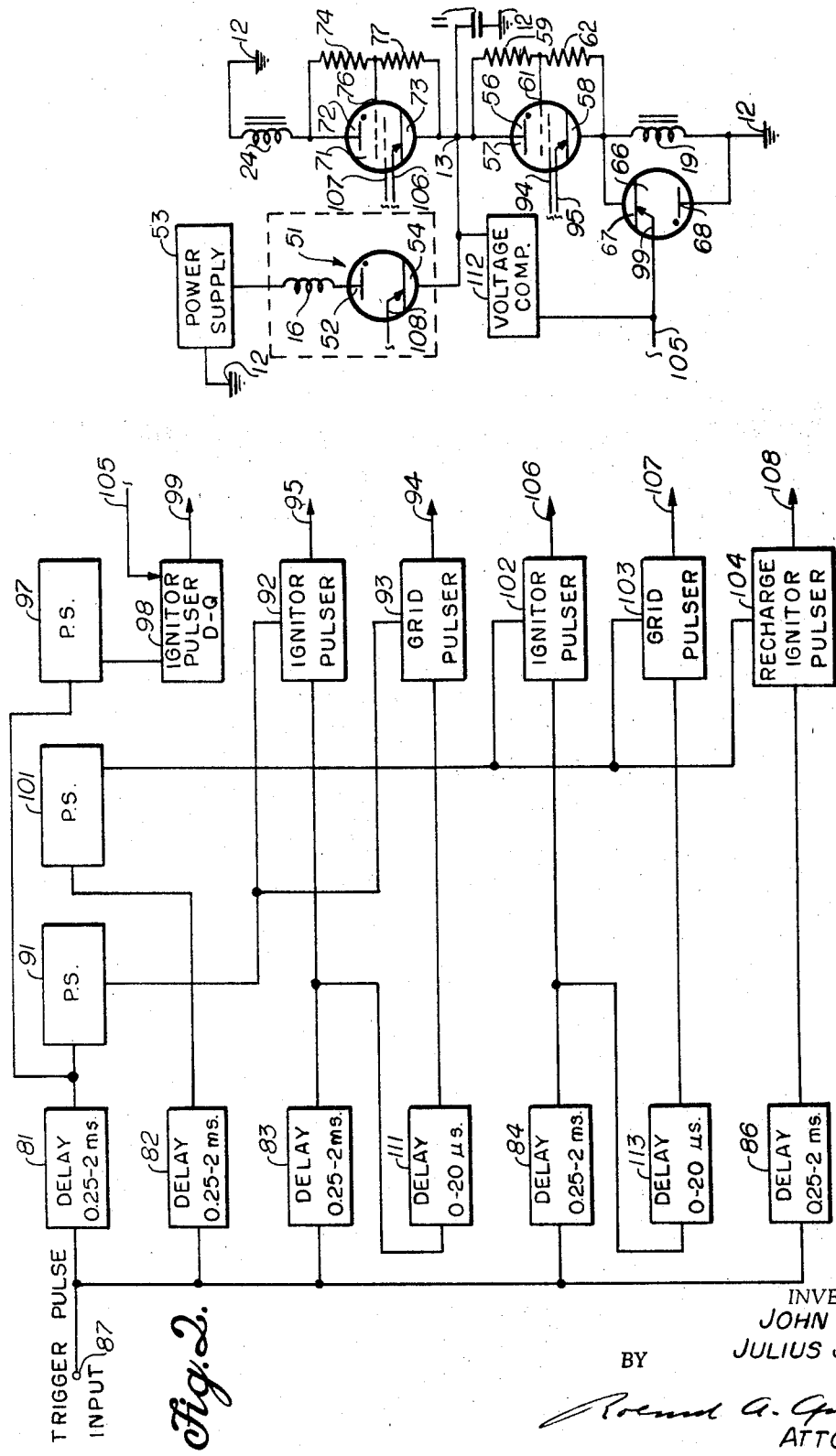

United States Patent Office 3,405,327
Patented Oct. 8, 1968

3,405,327
PULSE ENERGIZING AND ENERGY RECOVERY SYSTEM FOR AN ELECTROMAGNET
John L. Cole, Palo Alto, and Julius J. Muray, Los Altos, Calif., assignors to the United States of America as represented by the United States Atomic Energy Commission
Filed Oct. 19, 1965, Ser. No. 498,170
6 Claims. (Cl. 317—151)

ABSTRACT OF THE DISCLOSURE

A system for pulse energizing an electromagnet having a single winding wherein by switching a current source to charge, a capacitor is charged from a current source to a first voltage level at a first polarity, reversing the charge on the capacitor by switching it from one capacitor plate to the other through an inductance and clipping the voltage across the inductance at a precise second level that is lower in magnitude than the first level, and then applying the reversed charge to the electromagnet winding to simultaneously energize the electromagnet and partially recharge the capacitor in the direction of the first polarity.

---

This invention relates to cyclically energized magnet systems and particularly to a system in which an electromagnet is energized at a high repetition rate and at a variable closely controlled energy level.

Repetitiously pulsed electromagnets are employed for a wide variety of purposes, one of which, i.e., magnets employed for bending or switching of the beams output of high energy accelerators, presents unique problems for which satisfactory solutions have not been available. Magnets of the indicated type are employed for diverting a beam from within or for bending the output beams of electrons and other accelerated particles produced by cyclotrons, synchrotons, linear accelerators and other accelerators. In a late design electron accelerator a need has even arisen for means to select and divert alternate electron beam pulses of two or more different beams to two or more different targets or areas of use in order to achieve economics provided by multiple beam operation.

In accordance with the invention, apparatus for supplying high current electrical power pulses for precisely energizing particle beam deflection magnets or other inductive loads includes a capacitance energy storage means which is supplied from a low amperage direct current (D.C.) power supply. Means are provided in said apparatus for cyclically converting the initial charge on said capacitor to a charge of opposite polarity and of accurately selected variable voltage level, discharging the metered electrical charge to said load and recovering the residual energy therefrom to recharge said capacitor in the original polarity together with makeup energy supplied by said power supply. Additional means may be included for synchronizing the operation and the like as set forth in more detail hereinafter.

Large amounts of electrical power are required for such beam switching operations especially in the case of the higher energy beams now coming into use. With pulsing arrangements powered by simple on-off switching arrangements from a continuous power source none of the energy stored in the magnetic field is recovered and heat dissipation and cooling become aggravated problems. Apparatus must be of much greater capacity and the wastage of power is costly.

The problems involved with pulsed deflections systems will be appreciated if one considers both the velocity of the accelerator beam and the velocity and energy variations within the beam. In order to control the major portion of this beam, the pulsed magnetic deflection system must provide a pulsed magnet which is timed to accurately intercept the accelerator beam and provide a magnetic field having a relatively constant intensity profile interval for diverting the beam without seriously affecting the beam focus or allowable beam divergence.

Accordingly, it is an object of this invention:
(1) To provide an energy source for cyclically energizing an inductive load.
(2) To provide a high pulse rate magnetic deflection system for use in the beam switchyard of a particle accelerator.
(3) To provide a pulsed deflecting or switching magnet system capable of selectively switching accelerated beams of different energies and intensities on a pulse to pulse basis.
(4) To provide a continuously variable magnetic field pulse height intensity in a magnetic deflection circuit of a particle accelerator to accommodate beams of varying energy and divergence.
(5) To provide a high current pulsed power supply free of arc-back and attendant destructive hazards.
(6) To provide a modulated field energy power source for a pulsed magnetic field which recovers a high proportion of the energy of each cycle for reuse in a subsequent cycle.
(7) To provide a modulator for reliably pulsing a magnet to a selected narrow tolerance field value.

Other objects and advantageous features of the invention will become apparent by consideration of the following description and accompanying drawings of which:

FIGURE 2 is a circuit diagram of a preferred embodiment of a pulsed magnet system.

The pulsed magnet system of the invention is adapted for general usage where intermittent magnetic fields are required including generation of magnetic fields employed for binding or diverting segments of a high energy particle beam. The system is particularly adapted for diverting or bending particle beam bunches such as those produced by the highest energy linear electron accelerators, e.g., electron beam bunches with an energy of the order of 25 gev. or more.

Beam switching rates approaching 500 pulses/sec. may be used and, to minimize beam divergence and phase space introduced by the magnet system the magnetic field must be reliably regulated within 0.25% or better. While air core solenoids can be used for other purposes, high permeability core magnets, e.g., ferrite cores or laminate iron core magnets such as that disclosed by H. Brechna in SLAC-28, a technical report originated at the Stanford Linear Accelerator Center and available from the office of Technical Services, Department of Commerce, Washington, D.C., are generally required for effective beam path bending magnets. In usual practice the magnet coil structure of the vending magnet system is arranged at the beam exit end of the accelerator to divert selected particle bunches of one or more particle beams generated by the accelerator to targets, etc., arranged in locations offset from the axis of the exit beam. Once diverted the beams may be transported to the desired location utilizing steady state bending magnets and the like arranged as a beam transport system. Two of the energy sources herein described may be synchronized to divert alternate pulses or segments of one or more beams to different targets, e.g., to either side of the normal beam axis.

Figure 1:
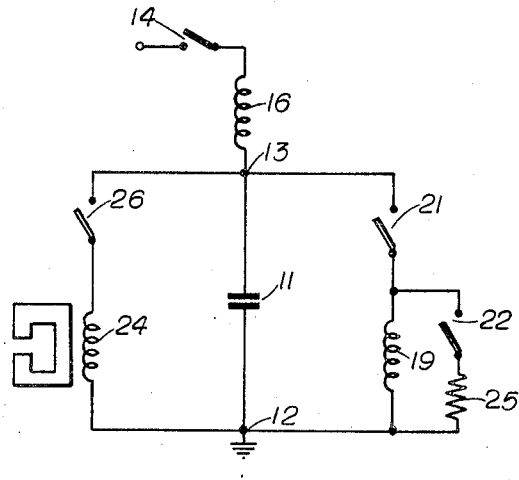
FIGURE 1 is a schematic diagram of the basic pulsed magnet system of the invention.

Basically, as shown in FIGURE 1, the pulsed magnet system of the invention, includes capacitor energy storage means 11 coupled between a ground reference junction 12 and a common high potential junction 13. Charging current is supplied from a D.C. power supply (not shown) through a first switching means 14 and a first charge current regulating inductor 16 to junction 13 with the second terminal of said supply coupled to ground 12. Means for disposing a closely metered charge on capacitor 11 includes a second inductor 19 coupled in series with a second switch means 21 between ground 12 and junction 13, and a third switch means 22 connected in series with energy dissipation resistance 23 across inductance 19 and actuated as set forth below. The magnet 24 to be pulsed is connected between ground 12 in series with a fourth switching means 26 to junction 13. The various switches may be manually or mechanically operated but are preferably of the triggered type and especially of the ignitron type described hereinafter.

In a typical cycle of operation switch 14 is closed long enough to charge capacitor 11 to a voltage of opposite polarity and greater than that required to energize magnet 24 and is then opened. Switch 21 is then closed whereupon capacitor 11 discharges through inductor 19 in a sinusoidal oscillation, i.e., ringing oscillation cycle of a frequency determined by the inductive-capacitive constants of the circuit. In the course of the discharge inductor 19 is energized in such a manner that the voltage cycle polarity passes through the zero point and then increases with a reverse polarity as the field of inductor 19 collapses. The increasing reverse polarity may now be employed to close switch 22 by a voltage sensing means when the voltage on capacitor 11 is at the level required to energize magnet 24 whereupon the excess energy in said capacitor is dissipated in resistance 25 so that switch 21 may be opened leaving the metered charge on capacitor 11. Now switch 26 may be closed to discharge the metered electrical charge through the coil of magnet 24 also as a sinusoidal oscillating or ringing cycle reaching a predetermined peak magnetic field intensity, e.g., at the time the particle beam is to be switched or otherwise as needed. At the completion of one-half of the ringing cycle capacitor 11 becomes recharged in a reversed polarity, as above, which corresponds to the initial polarity and switch 26 is then opened. In this manner all energy not dissipated by the magnet is recovered in the capacitor and the original voltage level is restored by closing switch 14 to supply recharging current as in the initial stage of the operation noted above to prepare for the next cycle.

The basic system disclosed above is advantageously incorporated with refinements to provide the embodiment illustrated in FIGURE 2 wherein ignitron devices are employed as preferred switching means and in which similar reference characters indicate components corresponding to those above. More particularly, the first switching means 16 is provided as ignitron 51 having the anode 52 connected through a charge regulating inductor 16 to the positive terminal of power supply 53, the negative terminal of which is attached to ground 12. The cathode 54 of ignitron 51 is connected to junction 13 for charging and recharging capacitor 11. Since ignitron 51 does not carry a large current the tube deionizes and shuts off automatically once capacitor 11 is charged.

The second switching means 21 is provided as a gridded ignitron 56 having anode 57 connected to junction 13 and the cathode 58 connected through inductor 19 to ground 12. To provide rapid deionization in high repetition rate high current service a voltage divider resistor 59 is coupled from anode 57 to shield grid 61 and resistor 62 from grid 61 to cathode 58. The use of a gridded ignitron as indicated is essential to assure positive current cutoff and prevent destructive arc-back with high current and high repetition rates, e.g., when the repetition rate is above about 200 pulses per second and as high as at least about 500 pulses/second. Ordinary ignitrons which omit the grids may be used only at lower energy levels and with lower repetition rates.

Third switching means 22 is provided as ignitron 66 having cathode 67 connected to the common connection between cathode 58 of ignitron 56 and inductor 19, and anode 68 is connected to ground 12 thereby being connected in parallel across inductor 19. Ignitron 66 may provide sufficient dissipation of the excess energy in inductor 19, however, a series resistor, e.g., 100 ohms may be included if more dissipation is required. Once the energy of the cycle has been dissipated, ignitron 66 cuts off and remains ready for the next cycle.

The fourth switching means 28 is provided as a gridded ignitron 71 having anode 72 connected to magnet 24 and cathode 73 connected to junction 13. To assure deionization, as above, resistor 74 is connected between anode 72 and shield grid 76 and resistor 77 from shield grid 76 to cathode 73 of ignitron 71.

Control circuitry for the foregoing is provided in the form of adjustable delay pulse generating means 81, 82, 83, 84 and 86 having a common trigger pulse input terminal 87. Trigger pulses may be synchronized with the pulsed input of an accelerator, approach of a particular beam bunch, repetitiously at timed intervals, etc., as needed in particular applications and by means well known in the art. Waveform and time relations of a magnet system designed for a magnet pulse rate of 360 pulses/second are shown in FIGURE 3 with typical variable delay time parameters, of the various delay devices, shown in FIGURE 2 which permit operation at other rates above and below the stated design point.

In order to avoid premature triggering of pulser units delay pulse generating means 81 is arranged to apply operating voltage from power supply 91 to pulser units 92, 93 connected to excite grid 94 and ignitor 95, respectively, of ignitron 56. Delay pulse generating means 81 simultaneously connects power supply 97 to pulser 98 which is connected to excite ignitor 99 of ignitron 66. Delay pulse generating means 82 similarly connects power supply 101 simultaneously to pulsers 102, 103, 104, which are connected to excite ignitor 106 and grid 107 of ignitron 71 and ignitor 108 of ignitron 51, respectively. The foregoing may conveniently be effected utilizing a silicon controlled rectifier (SCR) at the output of said power supplies which is actuated by pulses from said delay means to apply the operating voltage, e.g., about 200 microseconds before the pulsers are required to be excited.

Figure 3:
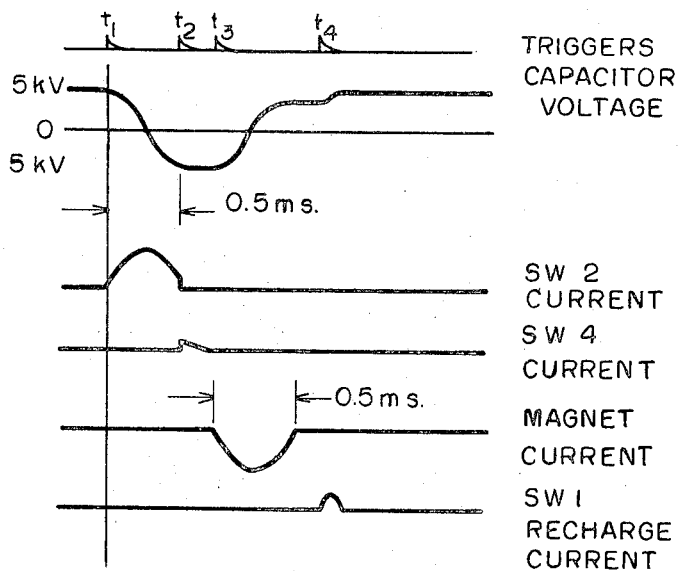
FIGURE 3 is a diagram of typical waveforms at selected points of FIGURES 1 and 2.

The operation cycle may be considered to begin with capacitor 11 charged as shown in FIGURE 3. Thenceforth in response to an input trigger pulse delay 83 supplies an actuating signal to pulser 92 to excite ignitor 95 of ignitron 56 prior to the subsequent actuation of grid pulser 93, at $t$, by delay 111 which itself is triggered simultaneously with pulser 92 by delay 83. Capacitor 11 thereupon discharges in series through inductance 19 with the voltage varying sinusoidal and reversing in polarity. Voltage comparator 112 connected between junction 13 and ground 12 monitors the reverse polarity voltage rising therebetween and at a preset-voltage level provides a signal pulse on line 105 to fire ignitor 99 of ignitron 66, at time $t_2$, to dissipate the excess energy in inductance 19 thereby disposing a preselected metered charge of reverse polarity on capacitor 11. Delay 84 then excites delay pulse generating means 113, pulser 102 and ignitor 106 of ignitron 71 prior to excitation of grid 107, at $t_3$, by a pulse supplied from delay 113, to energize magnet 24 at the desired time. Upon completion of the ringing half-cycle, delay pulse generating means 86 activates pulser 104 connected to the ignitor 108 of ignitron 51, at time $t_4$, so that power supply 53 recharges capacitor 11 to the initial level in preparation for a subsequent cycle.

Operating parameters for a typical pulsed magnet (five, 1 meter long, aligned sections):

| | |
|---|---|
| Repetition rate | 360 pulses/second. |
| Peak field | 1700 gauss. |
| Capacitor 11 | 10 microfarad. |
| Inductance 19 | 2.4 millihenry. |
| Magnet 24 | Do |
| Resonance frequency $C_{11}$ with $L16$ or magnet 24 (must be greater than double the operating repetition rate) | 1000 cycles/second. |
| Inductance 16 | $\approx 1$ millihenry. |
| Power supply | 5000 volts, 2 ampere D.C. |
| Peak current ignitrons 56–76 | 300 amperes. |
| Ignitrons 56–76 | Type GL 5630. |
| Ignitrons 51–66 | Type WL 4681. |
| Energy per pulse | 130 joules. |
| Peak field reproducible to ±0.25% with line voltage change of ±2% within 0.1% with constant line voltage. | |
| Energy recovered | Up to at least 85%. |

While a preferred embodiment of the invention has been described in the foregoing modifications may be made therein without departing from the scope of the invention as defined in the following claims.

What is claimed is:

1. In a pulsed electromagnet system the combination comprising capacitor storage means connected between a junction terminal and a ground terminal, D.C., power supply means, a current regulating inductance connected to an output terminal of said power supply, a first ignitron with the anode connected in series with said inductor to said output terminal of the power supply and the cathode to said junction terminal for applying a positive polarity charge on said capacitor, an inductance with one terminal connected to ground, a second ignitron having the anode connected to said junction terminal, and the cathode to the second terminal of said inductance to discharge said capacitor over one-half of an oscillatory discharge and reverse the polarity of said charge on the capacitor, means including a third ignitron with the cathode connected to the second terimnal of said inductance and the anode in series with a resistance to ground, comparator means for sensing attainment of a predetermined negative polarity voltage at said junction terminal and for supplying an actuating pulse to the ignitor of said third ignitron to dissipate excess energy stored in said inductance, an electromagnet having one terminal connected to ground, a fourth ignitron having the anode connected to the second terminal of said electromagnet and the cathode to said junction terminal, triggered delay pulse generating means for sequentially energizing at least the ignitors of said second, fourth and first ignitrons.

2. Apparatus as defined in claim 1 wherein said second and fourth ignitrons comprise gridded ignitrons each having a shielded grid coupled in voltage divided relation between the anode and cathode thereof, and each having a control grid arranged for actuation by said delayed pulse generating means subsequent to actuation of the ignitors thereof.

3. Apparatus as defined in claim 1 wherein said triggered sequentially delayed pulse generating means includes pulsers for energizing the ignitors of said ignitrons and power supplies for energizing said pulsers, said power supplies including switching means for applying the power therefrom to said pulsers, prior to actuation thereof.

4. In an inductive load an energy recovery pulsing system the combination comprising a storage capacitor connected between a common reference terminal and a high potential junction terminal, means for supplying an electrical charge of a first polarity to said capacitor, an inductance, means for connecting said inductance in series across said capacitor for at least one-half cycle of an oscillatory discharge resulting therefrom to dispose an electrical charge of a second polarity on said capacitor, an electromagnet having a single winding, and means for delivering said charge of second polarity of said capacitor to said single winding for simultaneously pulse energizing said electromagnet and partially recharging said capacitor in the direction of said first polarity.

5. The combination of claim 4 including means coupled to said junction terminal for sensing attainment of a predetermined voltage level in the direction of said second polarity and means actuated by said sensing means for switching electrical energy dissipative means across said inductance to maintain said voltage at said predetermined level on said capacitor prior to application of said charge of said second polarity from said capacitor to said winding.

6. In an inductive load and energy recovery pulsing system, the combination comprising a storage capacitor connected between a common ground terminal and a high potential junction terminal, first switching means including an ignitron for supplying an electrical charge of a first polarity to said capacitor, an inductance, second switching means including an ignitron for connecting said inductance in series across said capacitor for one-half cycle of oscillatory discharge of said capacitor therethrough to dispose an electrical charge of a second polarity on said second capacitor, an electromagnet, third switching means including an ignitron for connecting said electromagnet across said junction and ground terminal for at least one full half-cycle of the resulting oscillatory discharge of said capacitor therethrough, timed pulse generating means actuating said first, second and third switching means in sequence, fourth switching means including an ignitron connected in series across said inductance, and voltage comparator means connected to said junction terminal for actuating said fourth switching means ignitron on attainment at said junction terminal of a predetermined voltage level during said one-half cycle of discharge through said inductance for dissipating excess energy remaining in said inductance above the energy required to develop said predetermined voltage level.

References Cited

UNITED STATES PATENTS

| | | | |
|---|---|---|---|
| 2,147,472 | 2/1939 | Ulrey | 315—234 X |
| 2,920,259 | 1/1960 | Light | 321—2 |
| 3,158,791 | 11/1964 | Deneen et al. | 317—151 X |

JOHN F. COUCH, *Primary Examiner.*

R. LUPO, *Assistant Examiner.*